United States Patent [19]

Lee

[11] 4,022,653
[45] May 10, 1977

[54] PROCESS FOR SEPARATING SOAP FROM BLACK LIQUOR

[75] Inventor: Hong H. Lee, Gainesville, Fla.

[73] Assignee: Westvaco Corporation, New York, N.Y.

[22] Filed: Oct. 1, 1975

[21] Appl. No.: 618,396

[52] U.S. Cl. .......................... 162/16; 159/DIG. 5; 162/29; 210/71; 260/97.6; 260/97.7

[51] Int. Cl.² ...................................... D21C 11/00

[58] Field of Search ........... 162/16, 29, 30; 210/71; 23/273 F; 159/DIG. 5; 260/97.5, 97.6, 97.7

[56] References Cited

UNITED STATES PATENTS

| 2,111,259 | 3/1933 | Blengsli | 260/97.7 |
|---|---|---|---|
| 2,200,468 | 5/1940 | Cirves | 260/97.7 |
| 2,316,499 | 4/1943 | Borglin | 260/97.7 |
| 2,360,862 | 10/1944 | Morris et al. | 260/97.7 |
| 2,371,307 | 12/1939 | Mitchell | 260/97.7 |
| 2,780,281 | 2/1957 | Reinert | 159/DIG. 5 |
| 2,866,781 | 12/1958 | Chase et al. | 260/97.7 |
| 3,098,735 | 7/1963 | Clark | 62/58 |
| 3,248,890 | 5/1966 | Oman | 62/58 |
| 3,269,136 | 8/1966 | Umano | 62/58 |
| 3,449,313 | 6/1969 | Bolger et al. | 260/97.6 |
| 3,578,628 | 5/1971 | Chun et al. | 260/97.7 |
| 3,830,789 | 8/1974 | Garrett et al. | 260/97.6 |
| 3,880,704 | 4/1975 | Ziegler et al. | 260/97.7 |
| 3,965,085 | 6/1976 | Holmbom et al. | 260/97.7 |

Primary Examiner—Frank W. Lutter
Assistant Examiner—Frank Sever
Attorney, Agent, or Firm—W. Allen Marcontell; Richard L. Schmalz

[57] ABSTRACT

Soap is separated from spent, cellulosic pulping liquor by strenuously percolating a gaseous, aliphatic hydrocarbon through a quantity of liquor volume under such temperature and pressure conditions that an equilibrious strata of liquid phase hydrocarbon is sustained on the surface of the liquor. Following strenuous combination and agitation, the gas-liquor mixture is allowed to settle so that the entrained, gaseous hydrocarbon and coagulated soap floc gravimetrically rises to the liquor surface and stratifies with the soap layer between the residual liquor solution and a liquid phase layer of hydrocarbon. Thereafter, the liquid hydrocarbon and soap layer are decanted away from the residual liquor solution and depressurized to vaporize the hydrocarbon leaving a reservoir of isolated soap.

6 Claims, 1 Drawing Figure

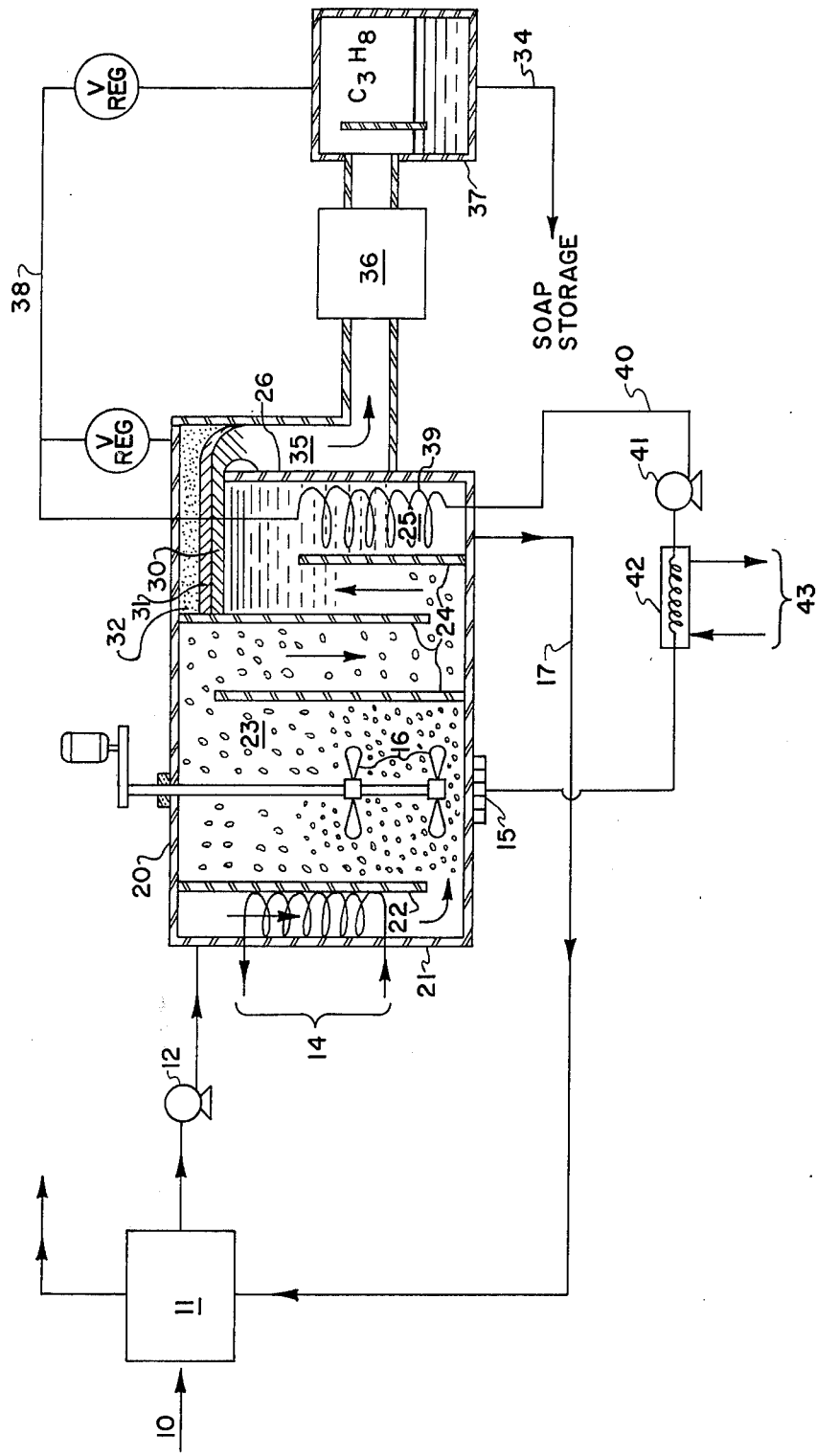

PROCESS FOR SEPARATING SOAP FROM BLACK LIQUOR

BACKGROUND OF THE INVENTION

1. Field Of The Invention

The present invention relates to the separation of soap from spent, cellulosic pulping liquors.

2. Description Of The Prior Art

When wood is thermochemically digested to paper pulp, the residual, aqueous cooking solution, called "black liquor" contains numerous, commercially valuable hydrocarbon compounds. Some of these compounds, in the raw state, are generically described as soap.

Such soap is held in colloidal suspension by the weak, 10 percent solids, black liquor as received from the pulp washers.

The processes most familiar to the prior art for segregating black liquor soap from the aqueous suspension medium comprise the additon of salt cake to a black liquor solution containing a 20 percent or greater solids concentration whereby the soap is released from the colloidal suspension by flocculation and allowed to gravimetrically stratify within a skimming vessel. Since the soap is the lighter phase, it may be removed by mechanically skimming the solution surface.

Another soap recovery process known to the prior art is described by U.S. Pat. No. 3,578,628 and comprises the admixture of a mixed solvent containing a liquid, aromatic hydrocarbon and alcohol with a 22 to 26 percent solids concentration of black liquor. The soap enters into solution with the mixed solvent to form a liquid phase which is lighter than the black liquor residual. The soap-mixed solvent phase is either decanted or skimmed from the residual liquor surface. Conventional distillation processes subsequently segregate the hydrocarbon and alcohol from the soap.

It is an object of the present invention, therefore, to teach a black liquor soap recovery process effective over a broader range of black liquor solids concentration than similar processes and especially, effective with weak black liquor.

Another object of the present invention is to teach a soap recovery process which yields a higher quality product relative to acid number than that produced by conventional processes.

Another object is to teach a soap recovery process that is compatible with a freeze process for concentrating black liquor solids.

SUMMARY OF THE INVENTION

These and other objects of the present invention are accomplished by the direct contact of cold, liquid phase black liquor with a gaseous phase aliphatic hydrocarbon such as propane ($C_3H_8$) or butane ($C_4H_{10}$). Intimate contact of chilled, pressurized black liquor with a gaseous phase light hydrocarbon causes soap to break from the colloidal system and rise to the solution surface where it stratifies, as a liquid, between the residual black liquor and a liquid phase strata of the hydrocarbon. Both soap and hydrocarbon may be decanted from the residual black liquor solution surface. Upon heating and/or depressurization, to below vapor critical conditions, the liquid phase hydrocarbon will vaporize from the hydrocarbon-soap mixture to leave only the soap.

BRIEF DESCRIPTION OF THE DRAWING

The single FIGURE of the drawing represents a continuous flow schematic of the present invention.

DESCRIPTION OF THE PREFERRED EMBODIMENT

Relative to the drawing, flow stream 10 carries pulp washer filtrate which is an approximately 10 percent solids concentration of dilute black liquor. As received from the washers, such dilute black liquor normally carries a temperature of approximately 190° F. This heat may be economically given up to other mediums such as concentrated black liquor emerging from a freeze concentraton system 11 similar to that disclosed in my co-pending U.S. Pat. application Ser. No. 546,423 filed Feb. 3, 1975, now U.S. Pat. No. 3,987,641.

By whatever means, the black liquor flow stream should be reduced in temperature to a convenient level within the range of 30° to 40° F.

Following preliminary cooling, the dilute black liquor is transferred by appropriate means such as pump 12 into a cooling section 21 of a pressure vessel 20. Operation of refrigeration system 14 within cooling section 21 is coordinated with the internal pressure of vessel 20. However, the liquor temperature must be sustained above the temperature of fusion for the aqueous solution which is normally in the order of 30° F.

Baffle plate 22 forces the liquor inflow stream to the bottom of a mixing chamber 23 to which a light, gaseous phase hydrocarbon, propane for example, is combined through an injection manifold 15.

The objective of temperature and pressure coordination and control within vessel 20 is the coexistent maintenance of both, liquid and gas phases of the hydrocarbon therein. For propane, this will allow an operational pressure range over 66 to 78 psia at 30° to 40° F. Butane allows an operational range of 68 to 84 psia at 30° to 40° F.

Within mixing chamber 23, the liquid-gas mixture is stirred thoroughly by means of a mechanical agitator 16 and/or ebullition from the gas release until substantial homogeneity is achieved.

From the mixing chamber 23, the mixture flow stream is directed through a labyrinth around baffles 24 into a settling or quietening chamber 25 where the hydrocarbon is allowed to gravimetrically dissociate from the liquor. Since the hydrocarbon and liquor compounds are substantially immiscible, such dissociation is substantially complete. However, as a result of mixing in the presence of the gaseous hydrocarbon, soap that was originally colloidally dispersed within the liquor solution is coagulated into flocculated molecular groupings so as to also gravimetrically separate from the liquor solution. Consequently, above the settled liquor volume within the chamber 25 are formed three distinct phase layers comprising a soap layer 30, a liquid phase hydrocarbon layer 31 and a gaseous phase hydrocarbon layer 32.

Residual liquor is withdrawn from the bottom of settling chamber 25 through conduit 17 for further processing such as concentration by the freeze plant 11, for example.

The soap and liquid hydrocarbon phases are skimmed or decanted from the residual liquor surface over a weir or baffle edge 26 into a separation conduit 35 which carries the immiscible mixture into a pressure reduction device 36.

From the pressure reducer 36, the soap-hydrocarbon flow stream is collected by a low pressure receiving vessel 37 wherein a sub-critical pressure for the hydrocarbon prevails. For propane at 35° F, an appropriate pressure for receiving vessel 37 would be less than 70 psia.

Due to the volatility of the hydrocarbon at the temperature and pressure conditions prevailing in receiving vessel 37, all hydrocarbon is vaporized thereby leaving only the soap to be withdrawn through conduit 34 to storage.

Such soap has been found by analysis to yield an acid number in the order of 180 on a 200 point scale whereas soap recovered by conventional processes yield acid numbers in the order of 150.

Since vaporization of the hydrocarbon in receiving vessel 37 creates a fluidized heat sink of considerable capacity, such throttled vapors may be directed by conduit 38 into an indirect heat exchange apparatus 39 within settling chamber 35. Depending on particular equipment designs and operating conditions, such additional heat removal capacity may be necessary to sustain a temperature within chamber 25 that is sufficiently low to assure the maintenance of a gas-liquid phase interface of the hydrocarbon.

From the heat exchange apparatus 39, the hydrocarbon is returned by condit 40 to a compresor 41 for recycle pressurization. Consistent with normal refrigeration design practice, an after-cooler 42 is provided in the compressor discharge conduit to exchange the heat of compression with an appropriate fluidized heat sink 43. Therefrom, the hydrocarbon is returned to the gas injecton manifold 15.

The foregoing description of the present invention has been directed to a continuous flow process embodiment thereof for the purpose collectively illustrating the step sequence of the process. It should be understood, however, that the invention could also be practiced on a batch flow basis with less elaborate equipment. In this case, gas mixing, agitation, settling and phase separation could all be performed in a single chamber pressure vessel in appropriate timed sequence.

While specific temperature and pressure conditions have been provided for practice of the invention with propane, it should be understood that most of the light, aliphatic hydrocarbons ($C_n+H_{2n+2}$) having less than 20 carbon atoms per molecule may be used in conjunction therewith. Moreover, for convenience and operational efficiency, an aliphatic hydrocarbon having a gaseous phase at standard atmospheric and pressure conditions is preferred. This condition normally specifies hydrocarbons having 4 carbon atoms per molecule or less.

It should also be understood that the particular heat transfer management described for the present invention is flexible and adaptations to particular mill conditions would be obvious in the spirit of heat transfer efficiency.

Having fully described my invention, I claim:

1. A process for separating soap compounds from spent cellulosic pulping liquor comprising the steps of:
   A. Charging a pressure vessel with a quantity of said liquor;
   B. Adjusting the temperature and pressure of said liquor to coincide with a respective pressure and temperature of a point which falls within the gas/liquid range of the phase diagram of a light, aliphatic hydrocarbon having less than 20 carbon atoms per molecule but above a corresponding freezing point of said liquor;
   C. Percolating a vapor phase quantity of said aliphatic hydrocarbon through said liquor quantity;
   D. Agitating said quantity of liquor substantially simultaneously with said percolation;
   E. Quiescing said percolated quantity of liquor for gravimetric separation of said hydrocarbon and coagulated soap therefrom into respective strata above the surface of said liquor quantity;
   F. Collectively separating soap and liquid hydrocarbon strata from the surface of said liquor quantity;
   G. Adjusting the temperature and pressure of said separated soap and liquid hydrocarbon to within the vaporization range of said hydrocarbon; and
   H. Venting vaporized hydrocarbon from the presence of said soap.

2. A process as described by claim 1 wherein said liquor temperature is adjusted to less than 40° F and said pressure is greater than 66 psia.

3. A process as described by claim 2 wherein said hydrocarbon is propane.

4. A process as described by claim 3 wherein said propane is injected into said quantity of liquor in the vapor phase at a temperature of greater than 30° F.

5. A process as described by claim 2 wherein said hydrocarbon is butane.

6. A process as described by claim 5 wherein said butane is injected into said quantity of liquor in the vapor phase at a temperature of greater than 30° F.

* * * * *